United States Patent [19]
Goetz et al.

[11] Patent Number: 5,838,425
[45] Date of Patent: Nov. 17, 1998

[54] EXPOSURE CONTROL FOR THE PHOTOGRAPHIC RECORDING OF A MICROSCOPE IMAGE

[75] Inventors: Burkhard Goetz, Jena; Dirk Kohle, Heidenheim; Johannes Knoblich; Hans Tandler, both of Jena; Bernd Faltermeier, Aalen, all of Germany

[73] Assignee: Carl Zeiss Jena GmbH, Jena, Germany

[21] Appl. No.: 752,313

[22] Filed: Nov. 19, 1996

[30] Foreign Application Priority Data

Nov. 23, 1995 [DE] Germany .......................... 195 43 585.0
Nov. 14, 1996 [DE] Germany .......................... 196 46 962.7

[51] Int. Cl.$^6$ ..................................................... G03B 7/08
[52] U.S. Cl. ............................ 355/18; 355/68; 250/214 P
[58] Field of Search ................................. 355/67–69, 77; 250/216, 397, 583, 201.2, 205, 214 P; 396/234

[56] References Cited

U.S. PATENT DOCUMENTS

| | | | |
|---|---|---|---|
| 4,364,650 | 12/1982 | Terashita et al. | 396/234 |
| 4,866,274 | 9/1989 | Hosoi et al. | 250/397 |
| 5,124,842 | 6/1992 | Honda et al. | 359/561 |
| 5,308,972 | 5/1994 | Nagano et al. | 250/216 |

FOREIGN PATENT DOCUMENTS

| | | |
|---|---|---|
| 0124241 | 11/1984 | European Pat. Off. . |
| 3506492 | 8/1986 | Germany . |
| 19517476 | 11/1995 | Germany . |

OTHER PUBLICATIONS

European Search Report—dated Mar. 10, 1997.

Primary Examiner—D. Rutledge
Attorney, Agent, or Firm—McAulay Nissen Goldberg Kiel & Hand, LLP

[57] ABSTRACT

An exposure control system for the photographic recording of a microscope image comprises a two dimensional photographic receiver arrangement for detecting the image brightness of the microscope image. The receiver arrangement is a component part of a camera system which is attachable to a standard camera part of a microscope. The receiver arrangement has an interface for transmitting image information of a microscopic object detected by the receiver arrangement to a viewing unit. A first input device is included to which the viewing unit is coupled for manual selection of at least one optical image region on the receiver arrangement. The intensity value of the image region forming a control signal for the exposure time of the photographic recording.

27 Claims, 6 Drawing Sheets

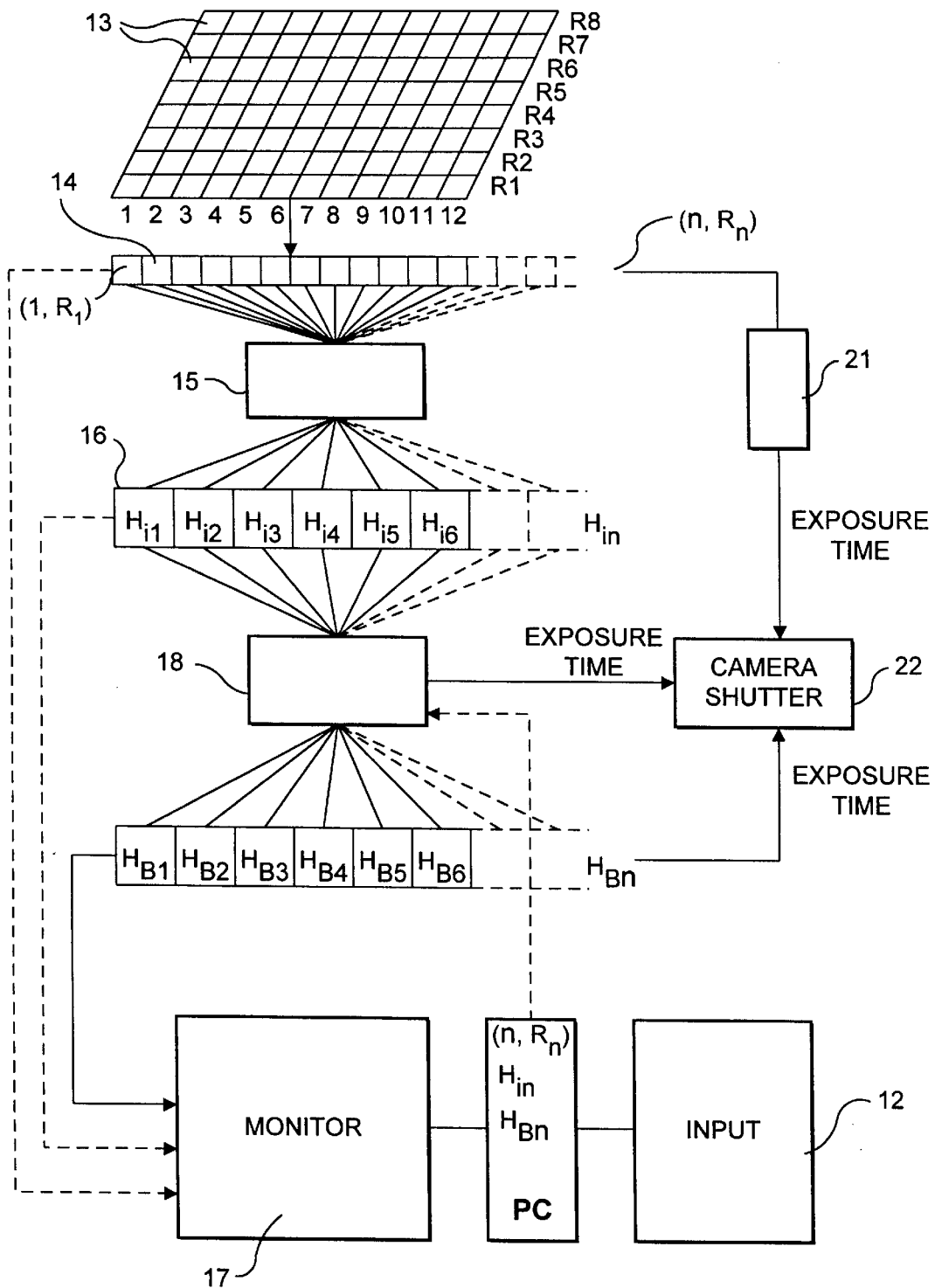
F I G. 3

EXPOSURE CONTROL FOR THE PHOTOGRAPHIC RECORDING OF A MICROSCOPE IMAGE

BACKGROUND OF THE INVENTION a) Field of the Invention

Spot measurement of different measurement surfaces (e.g., 3%, 1%, 0.1% of the entire small-picture format surface area) which is known in microphotography with microscopes is used for the precise measurement of exposure with respect to an object detail by means of sensors, especially in the case of highly dynamic microscopic objects, e.g., fluorescence, darkfield, and pole specimens.

b) Description of the Related Art

For this purpose, the object detail to be measured is either moved into the center of the field of view of the microscope eyepiece or framing eyepiece of the microscope camera (by centering the object on the microscope stage), this field-of-view center being distinguished by a framing mark, or is captured by a displaceable slit limiter or aperture restrictor.

Both methods require exact centering of the object detail (spot measurement surface) and framing mark for the sensor measuring the exposure time. But even when precisely carried out by the user, this centering does not always guarantee a definite spot positioning and thus correct exposure of the desired object detail.

This faulty spot positioning occurs as a result of a systematic cumulative centering error of the microscope/camera system in the order of magnitude of the spot diameter due to the adding up of centering tolerances of the individual mechanical system component interfaces (eyepiece and microscope eyepiece tube or framing eyepiece and microscope camera; camera port microscope tube and connection adapter for microscope cameras; photographic eyepiece or projection eyepiece and connection adapter for microscope camera; microscope camera and connection adapter microscope camera).

In addition to the systematic cumulative centering error of the microscope/camera system which cannot be influenced by the user, there is also a subjective, random centering adjustment error stemming from the user's adjusting skill, i.e., the user's aptitude for positioning the object detail (spot position) to be illuminated in the actual marked measurement position (cross-lines center of the setting aid, e.g., eyepiece or framing eyepiece).

Both of the error components described above become a fundamental problem especially with the "0.1% spot", i.e., small spot measurement method, often resulting in incorrect exposures.

In DE-A1 3410682, a plurality of photoelectric detectors are positioned in the image plane of a photomicroscope in different areas of the image region so that irregularities in the illumination intensity distribution are displayed to the user.

In DE 3506492 A1, a multiple-field array with controllable transmission is arranged in the optical beam path of an optical instrument and is illuminated field-by-field by a processor, a photoreceiver or photoreceiver array being arranged downstream of the multiple-field array, and the individual measured brightness signals are evaluated. An optimum exposure time is determined via computer from the fields containing object structures by determining the ratio of the illuminated fields to the total number of all fields.

In EP 380904 B1, the usual video camera attachment employed on a microscope is replaced by a two-dimensional semiconductor image receiver which is provided in the primary image plane of an objective with an ultra-wide, flattened field and large numerical aperture in order to generate real-time digital images without additional intermediate optical elements.

In DE 19517476 A1, which is not a prior publication, a video camera attached to the microscope serves to determine the exposure time of a connected still camera. Different image areas of the generated video image which are selected by the user are utilized for the exposure control. The exposure time is determined by averaging, for which purpose an attached video camera is always required. However, when a video camera is attached the optical system must be calibrated to the recording parameters of the respective camera.

OBJECT AND SUMMARY OF THE INVENTION

It is the primary object of the present invention to ensure an exact correspondence between the exposure time to be adjusted and the object detail in question without centering errors and in a simple manner while still enabling all-purpose modification.

According to the invention, an exposure control system for the photographic recording of a microscope image comprising a two dimensional photographic receiver arrangement for detecting the image brightness of the microscope image. The receiver arrangement is a component part of a camera system which is attachable to a standard camera part of a microscope. The receiver arrangement has an interface for transmitting image information of a microscopic object detected by the receiver arrangement to a viewing unit. A first input device is included to which the viewing unit is coupled for manual selection of at least one optical image region on the receiver arrangement. The intensity value of the image region forming a control signal for the exposure time of the photographic recording.

When the image section which is relevant for exposure and which is projected on the CCD matrix is converted via an algorithm (computer program) into a cluster image format in the form of an intensity raster image and is displayed on a computer screen (or laptop display or notebook display) as a grayscale or color raster image in which the object details are still discernable, the user can click on the desired object detail on the working surface given a suitable size of the raster image on the monitor and a resulting minimum individual cluster size with individual cluster resolution. The image which is visible on the viewing unit can be changed directly on the screen by means of a suitable input device, via a mouse control, if desired, wherein a plurality of photosensitive regions of the receiver arrangement on the viewing unit are grouped in a cluster of optional size, particularly by means of electronic image processing. By selecting at least one cluster, the intensity value of this cluster which is derived from the individual regions, e.g., by averaging, is used as a control signal for the exposure time.

A change in the image contrast can also be advantageously carried out by means of the input device in order to clearly emphasize regions of specific interest.

Values corresponding to brightness are derived from the signals of the photosensitive regions of the receiver arrangement. There is a first temporary or intermediate storage of the brightness values of at least a portion of the individual image elements as well as a second intermediate storage of these brightness values in second intermediate storage elements which correspond to determined brightness values or regions. The frequency of occurring brightness values or regions is determined and displayed by means of the readout of the second intermediate storage elements.

Exposure times are advantageously determined from the values of the first and/or second intermediate storage elements and are stored and displayed according to their value or value range.

The inventive solution is explained more fully hereinafter with reference to schematic diagrams.

BRIEF DESCRIPTION OF THE DRAWINGS

FIG. 3 shows a schematic diagram of the exposure control according to the invention;

DESCRIPTION OF THE PREFERRED EMBODIMENTS

Figure 1:
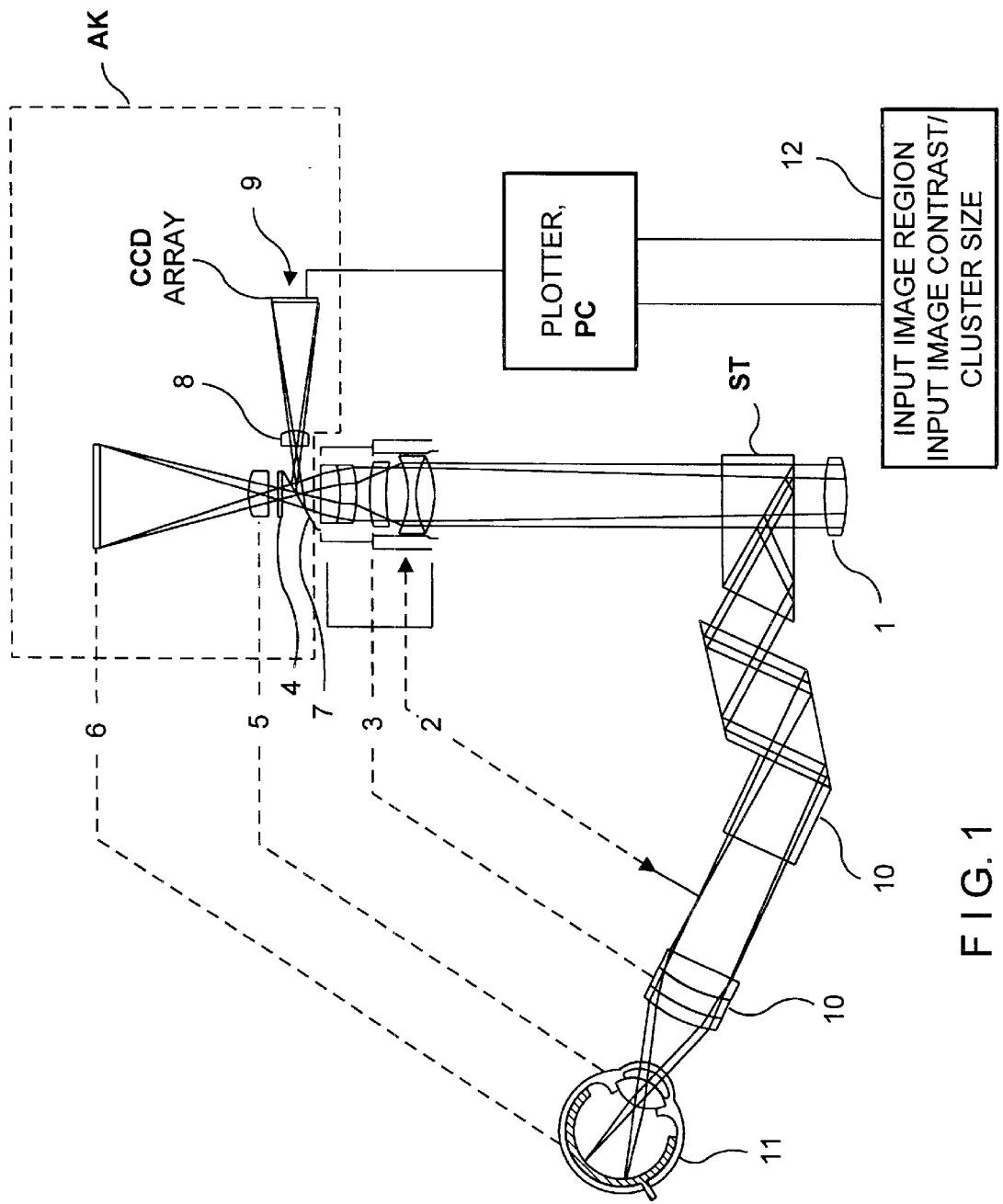
FIG. 1 shows an optical beam path for microphotography proceeding from the tube lens of a microscope in the direction of a recording system.

The intermediate image 2 formed by a tube lens 1 of a microscope is enlarged via a photographic eyepiece 3 in a photographic beam path (photo-tube) which is arranged downstream of a beam splitter element ST.

A swivel mirror 7 is arranged downstream of the photographic eyepiece 3.

When the mirror 7 is swiveled out of the beam path and the central shutter 4 is opened, an objective 5 generates an enlarged intermediate image 6 in the film plane 6 of a recording unit, not shown.

In order to control the exposure, the swivel mirror 7 is swiveled into the beam path so that an intermediate image 9 is generated, via exposure optics 8, on a CCD matrix which is connected via a logic circuit, not shown, with a plotter associated with a PC.

The intermediate image 2 is viewed by the eye 11 of the observer via the beam splitter ST and a binocular tube 10. The swivel mirror 7, shutter 4, objective 5 and film plane 6 as well as the exposure optics 8 and CCD matrix form an integrated component part of an attachable camera system AK which is attachable to the camera port downstream of the photographic eyepiece 3 or projection eyepiece, depending upon the optical system, so that there is no need for an adjustment or calibration of the individual elements to one another or for recalibration which is required in the event of a separate attachment of a video camera.

A dimensioning example for estimating the cluster size on a PC monitor is given by way of example in the following:

When using a ⅓" CCD chip with a sensor surface of 3.6×4.8 mm and a pixel count of 500×680 individual pixels, the small-picture format of 2.4×3.6 mm²=8.64 mm² can be imaged on the chip surface using suitable optics. Generally, only an image section (usually only 30% of the image format surface) is used for exposure measurement.

If 9×14 individual pixels are grouped in a cluster, for example, this gives a cluster receiver surface of 88×88 µm.

A spot size of 0.1% is achieved with this cluster size and an integral measurement surface of 44% results, for example, when 21×21 clusters are combined (resulting receiver surface: 3.42 mm²).

A spot measurement format of 17×26 clusters×442 clusters on the chip surface, i.e., 442 individual spot positions, for example, gives the cluster image format of 1.5×2.3 mm×3.45 mm².

Conversion of the cluster image format to a 10.4" screen (via the small-picture total format of 2.4×3.6 mm) with optional representation of the cluster image in vertical or transverse format on the monitor gives a rastered grayscale-value cluster image of 66×99 mm and the individual cluster of 3.8×3.8 mm which can be clicked on for spot measurement. This grayscale-value cluster image is shown schematically in FIG. 2.

Figure 2:
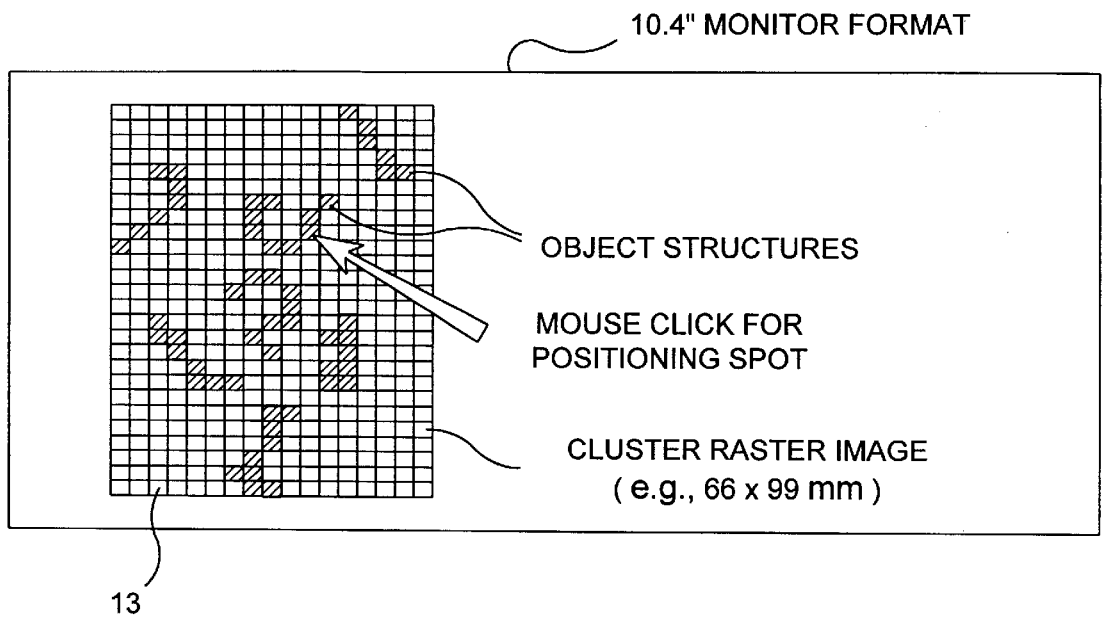
FIG. 2 shows an image of observed object structures which is displayed on a monitor by image processing.

FIG. 2 shows a cluster image display on a notebook monitor with individual clusters 13 and displayed object structures of different brightness and a mouse click which can be positioned on specified individual clusters to determine the optimum exposure time with reference to the brightness of a cluster or cluster group.

The solution according to the invention which consists in clicking on detectable cluster image object details as a novel spot measurement method provides a definite correspondence between the object to be exposed and the exposure sensor, thus eliminating the centering tolerance problems and related faulty exposures which can frequently occur in conventional spot measurements.

Image-processing means for forming and displaying clusters and accordingly for alienation and contrast enhancement of object structures are known in the art by their use, e.g., for the detection of objects by means of image recording systems in industrial robots, for alienated depiction of persons on television or also as PC screen savers.

According to the invention, an input device 12 is provided in FIG. 1 for setting the size of the individual clusters (image regions) and changing the picture contrast via the PC. This input device can also be displayed on the PC screen and can be set by clicking the mouse.

An advantageous process and an arrangement for determining optimum exposure times for a very wide variety of objects and specimens to be photographed will be described hereinafter with reference to the diagram shown in FIG. 3.

The image regions or clusters 13 which are displayed on the monitor and which can be selected individually or in groups and represent an intensity raster image, a plurality of photosensitive regions of the CCD matrix according to FIG. 1 being grouped together to form a cluster, are associated with individual intermediate storage elements 14 for storing the brightness value which is derived from the individual brightness values of the photosensitive regions, e.g., by averaging. By numbering the individual clusters by line 1 . . . n and by column R1 . . . Rn, as is shown, each individual cluster 13 having coordinates 1,R1 . . . n,Rn is assigned an intermediate storage element 14 containing information about the brightness value of the individual cluster as a numerical value for which there is a corresponding determined optimum exposure time.

The values of these intermediate storages can now be displayed on the viewing unit 17 as a cluster image as was already explained and shown in the preceding. The intermediate storages 14 are further advantageously read out in sequence by means of a processing step 15 and are counted and ranked with respect to their brightness value in intermediate storages 16 according to histogram classes Hi1 . . .

Hin which correspond to determined brightness values or regions. In this way, information is obtained about the frequency of occurrence of determined brightness values or regions of the individual clusters 1,R1 . . . n,Rn. The determined frequency distribution is displayed on a monitor 17. However, by means of a further processing step 18, it is also possible to display histogram classes of the exposure time values of the individual clusters HB1 . . . HBn formed from the brightness values in storages 14, 16 by readout and multiplication by a predetermined factor k which depends, among other things, on the light-sensitivity of the utilized film and the optical recording parameters.

The method of cluster formation can also be advantageously realized automatically in that the values of the intermediate storage 14 are converted into exposure times via a processing step 21 and are utilized directly for controlling the exposure time of the shutter of a camera 22, wherein the current brightness value and associated exposure time for a selected cluster are constantly determined anew and adjusted. Owing to the unique allocation of the individual clusters, changes in the cluster brightness can be taken into account in one and the same specimen by means of running processes. The processing step 18 in which the determined and stored brightness values are processed can also calculate the exposure times from the brightness values and can transmit the exposure time of a preselected cluster directly to the camera 22 for control purposes. A feedback line, shown in dashed lines, leading from the PC to step 18 is provided for this purpose. This operation can also be effected automatically, i.e., the current exposure time value for a cluster is always recalculated anew and is used for setting the exposure time value at the camera 22.

Figure 4:
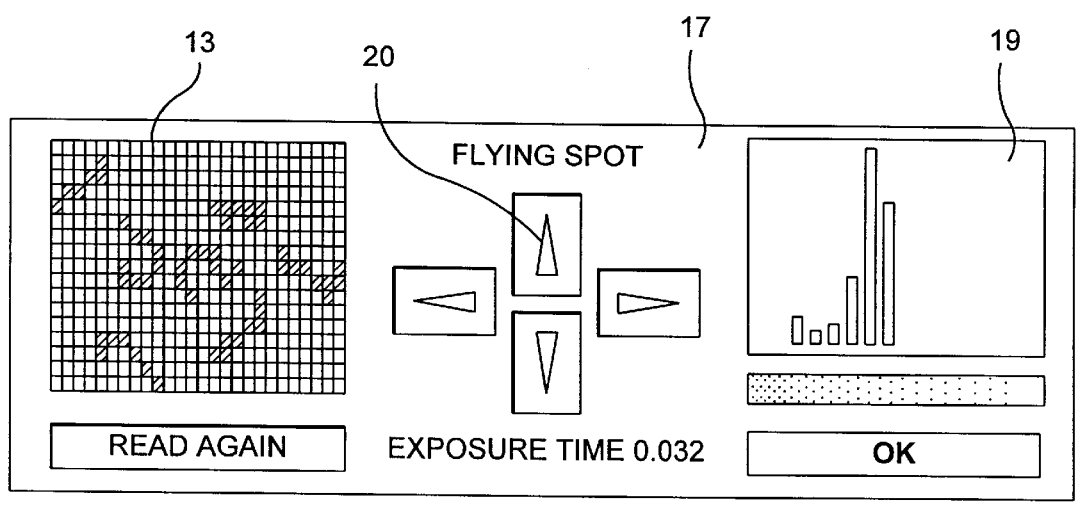
FIG. 4 shows a monitor picture with cluster image and frequency distribution.

FIG. 4 shows a schematic diagram of a cluster field comprising individual clusters 13 which is displayed on the monitor 17. A bar chart 19 indicating the frequency of the individual brightness values or the frequency of the exposure times of the clusters 13 calculated therefrom is shown on the other side of the monitor. Also making up a component of the monitor image is an input device which can be operated by means of a PC mouse for changing the selected position on the cluster field 13 and can be switched for selecting a determined frequency class on the diagram 19. In this way, the user can either select a determined cluster or cluster group containing the object structure in question, the appropriate frequency class being assigned to the latter, or can select a frequency class and display all individual clusters whose brightness corresponds to this class. The advantage herein consists in that the user can check whether or not the object detail in question is actually being acquired at an optimum exposure time for a determined frequency class and the user can determine which frequency classes are taken into consideration for selecting the correct exposure time for further photographic recordings. For fluorescence measurements, for example, the user can accordingly preselect the highest possible brightness class or can have this preselected automatically or can select a class below the highest brightness class.

Figure 5:
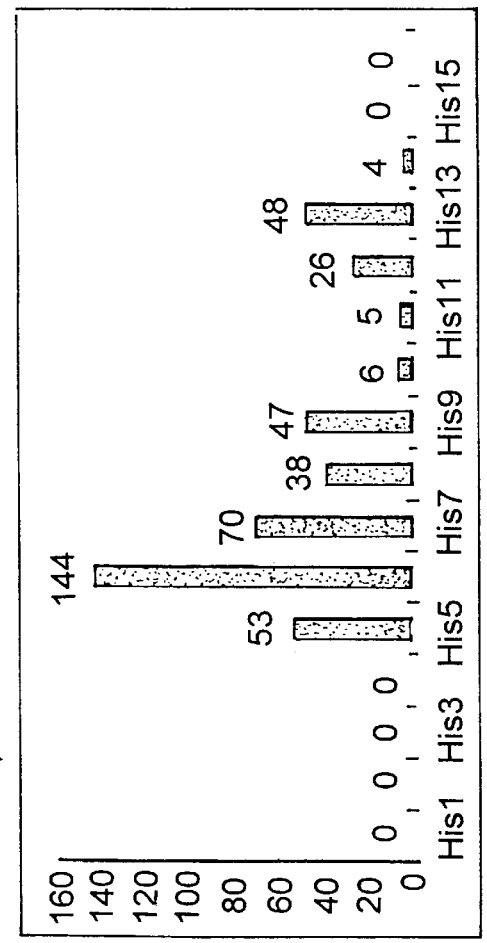
FIG. 5 shows an example of a recorded grid structure.
Figure 5:
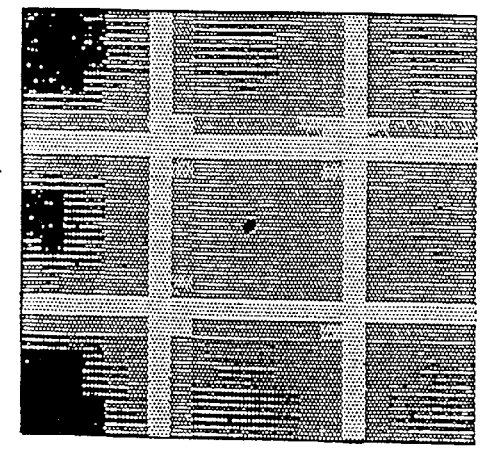
Figure 6:
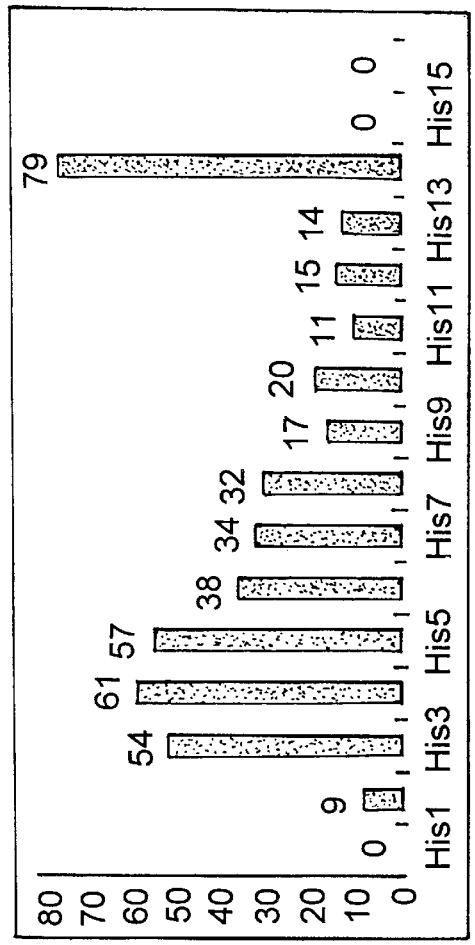
FIG. 6 shows an example of a recorded point.
Figure 6:
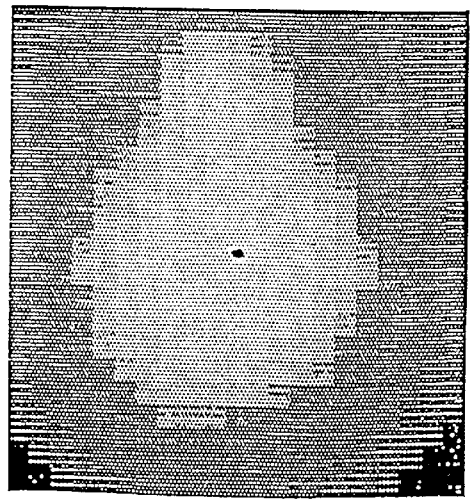

By way of example, FIGS. 5 and 6 show the photographic recording of a grid structure and a point, respectively, and the cluster field which is displayed on the monitor as a grayscale value distribution and to which is associated the frequency distribution as bar chart.

The user can click on specified frequency classes by means of a PC mouse and can check, with reference to the cluster image, whether the image region which is of interest to the user is contained and can trigger the recording with the exposure time corresponding to this frequency class.

Figure 7:
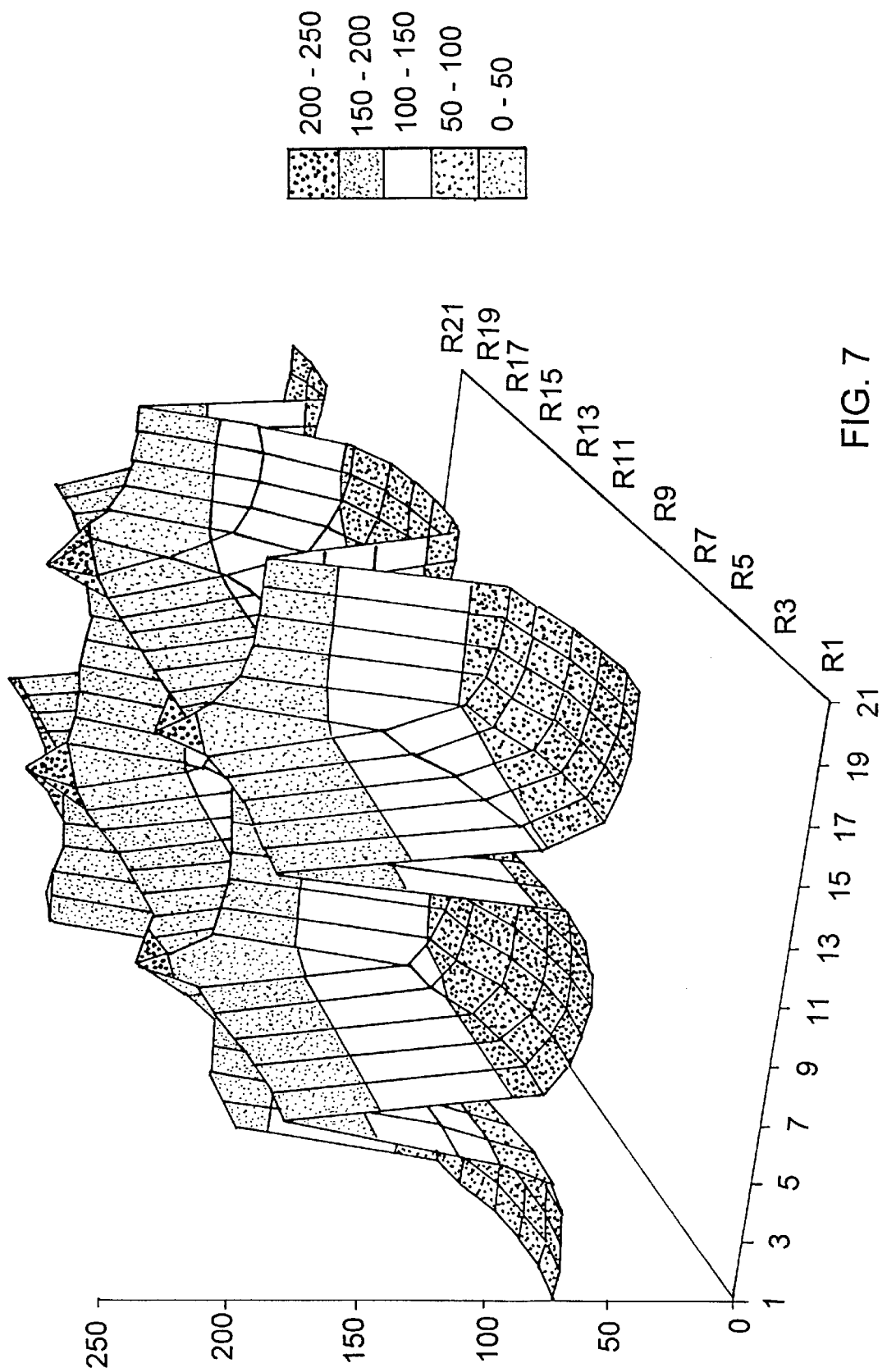
FIGS. 7 and 8 show three-dimensional frequency distributions of the brightness of the structures according to FIGS. 5 and 6.
Figure 8:
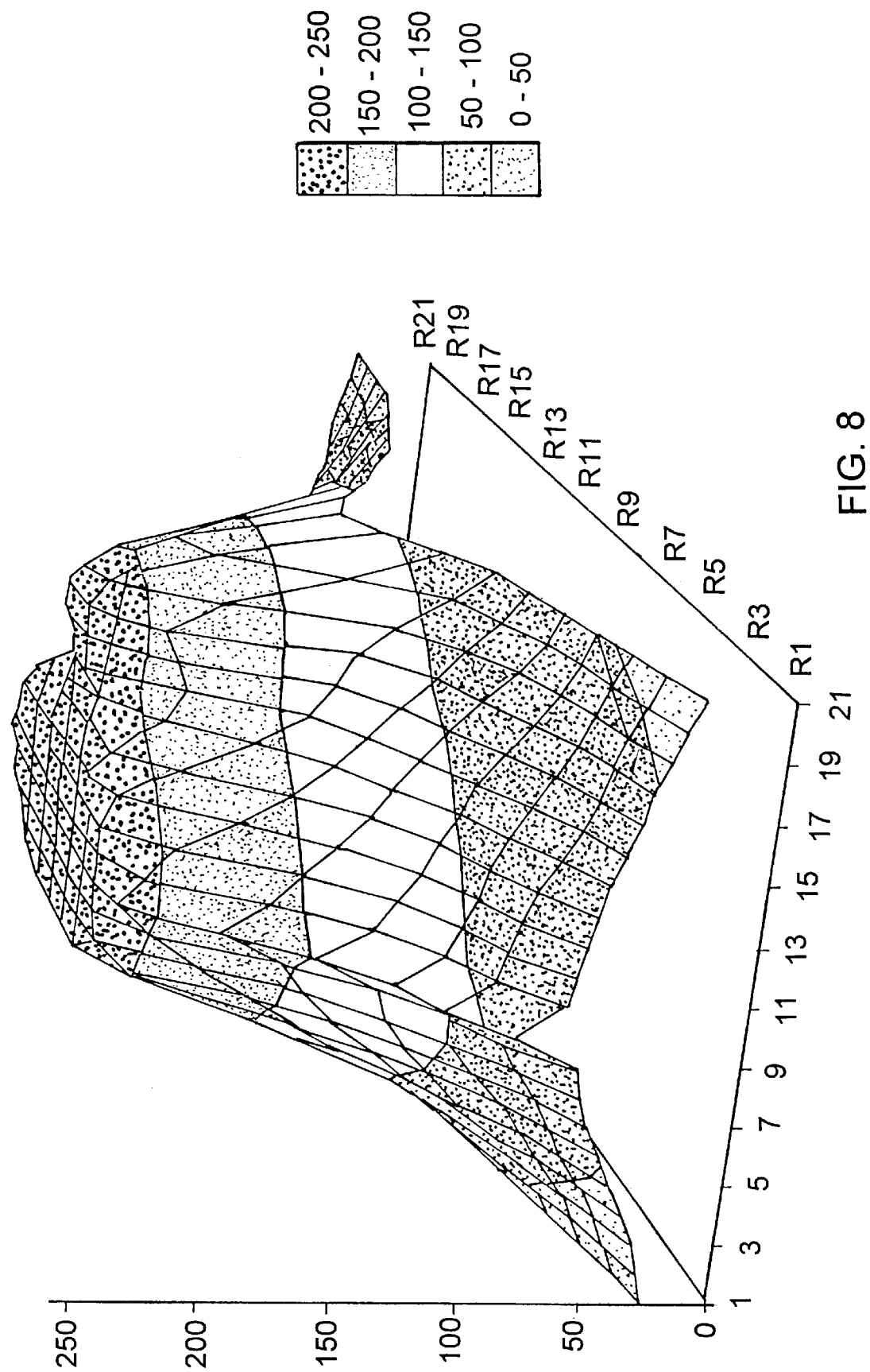

In FIGS. 7 and 8, the frequency distributions of the image brightness or exposure time according to FIGS. 5 and 6 are associated directly with the object structure, different frequencies being displayed as different grayscale values or color values. In this case, the user can select the exposure time for the image region in question directly on the object to be recorded so as to allow an optimum recording of precisely this image region.

The use of the invention is not limited only to its application for exposure control which is described here. Rather other conceivable advantageous applications enabling automatic acquisition, classification or testing of specified objects via cluster formation and detection of the image brightness distribution and its frequency classes can be realized by the invention.

While the foregoing description and drawing represent the present invention, it will be obvious to those skilled in the art that various changes may be made therein within without departing from the true spirit and scope of the present invention.

What is claimed is:

1. An exposure control system for the photographic recording of a microscope image comprising:

a two-dimensional photoelectric receiver arrangement for detecting the image brightness of the microscope image, said receiver arrangement being a component part of a camera system which is attachable to a standard camera port of a microscope;

said receiver arrangement having an interface for transmitting image information of a microscopic object detected by said receiver arrangement to a viewing unit; and a first input device to which said viewing unit is coupled operable to receive a manual selection of at least one optional image region on the receiver arrangement, said exposure control system including means for forming from the intensity value of said image region a control signal for the exposure time of the photographic recording.

2. The expose system control according to claim 1, wherein a second input device is provided for changing the image displayed on the viewing unit.

3. The exposure control system according to claim 1, further comprising an electronic image processor for grouping a plurality of photosensitive regions of the receiver arrangement on the viewing unit in a cluster and for forming from the intensity value of a selected cluster the control signal for the exposure time.

4. The exposure control system according to claim 1, further comprising a second input device for changing the image contrast.

5. The exposure control system according to claim 1, wherein the viewing unit is operable to display the microscopic object as a grayscale raster image and said means for forming forms from the intensity value of a grayscale raster the control signal for the exposure time.

6. The exposure control system according to claim 2, further comprising means for selecting a cluster size, and wherein the image resolution is a function of the cluster size.

7. The exposure control system according to claim 1, wherein the receiver arrangement is a CCD matrix.

8. The exposure control system according to claim 1, wherein at least one of the first and second input device is controlled via a PC monitor.

9. The exposure control system according to claim 1, wherein a same clusters of the receiver arrangement are used repeatedly to form a control signal for the exposure time and the exposure time is corrected in each instance to the most current value.

10. In an arrangement for detecting the image brightness of a microscope image, comprising:

a receiver arrangement for detecting at least a part of the image; and an electronic image processor for grouping a plurality of photosensitive regions of said receiver arrangement into image regions of adjustable dimensions, and for deriving the brightness value of said image regions from the brightness values of the individual photosensitive region.

11. The arrangement according to claim 10, having processing means for deriving a value corresponding to the brightness from the signals of the photosensitive regions of the receiver arrangement, first intermediate storage elements for storing the brightness values of at least a portion of the individual image elements, and processing means for forming an exposure value from the brightness values stored in the first intermediate storage elements.

12. The arrangement according to claim 10, having second intermediate storage elements which correspond to determined brightness values or regions, processing means between the first and second intermediate storage elements for the readout of the brightness values and for allocating and storing the brightness values in the second intermediate storage elements.

13. The arrangement according to claim 10, further comprising means for determine an exposure value from the brightness values.

14. In an arrangement for detecting the image brightness of a microscope image, comprising:

a receiver arrangement for detecting at least a part of the image;

a viewing unit;

an interface being provided between said receiver arrangement and said viewing unit for transmitting and displaying the image information detected by the receiver unit; and an electronic image processor for grouping a plurality of photosensitive regions of the receiver arrangement into image regions of adjustable dimensions, and for deriving the brightness value of said image regions from the brightness values of the individual photosensitive regions.

15. The arrangement according to claim 14, having processing means for deriving a value corresponding to the brightness from the signals of the photosensitive regions of the receiver arrangement, and first intermediate storage elements for storing the brightness values of at least a portion of the individual image elements.

16. The arrangement according to claim 15, having second intermediate storage elements which correspond to determined brightness values or regions, processing means between the first and second intermediate storage elements for the readout of the brightness values and for allocating and storing the brightness values in the second intermediate storage elements, processing means for the readout of the second intermediate storage elements and for displaying the frequencies of occurring brightness values.

17. The arrangement according to claim 16, having processing means for calculating the respective exposure times from the values of the first and second intermediate storage elements.

18. The arrangement according to one of claim 14, having third intermediate storage elements for storing the calculated exposure values according to their value or value ranges.

19. The arrangement according to one of claim 14, having means for selecting at least an image region on the viewing unit.

20. The arrangement according to claim 19, wherein first means are provided for selecting at least an image region are arranged on the screen itself and can be controlled by clicking a mouse or a touchscreen.

21. The arrangement according to one of claim 15, having second means for selecting at least a frequency of occurring brightness values on the viewing unit.

22. The arrangement according to claim 19, wherein first and second means for selection are arranged at the same time on the viewing unit.

23. In a process for detecting the image brightness of a microscope image, comprising the steps of:

detecting at least a part of the image by a receiver arrangement and transmitting said detected image to a viewing unit via an interface between the receiver arrangement;

displaying image information detected by the receiver unit by said viewing unit;

grouping a plurality of photosensitive regions of the receiver arrangement into image regions of adjustable dimensions by electronic image processing; and deriving the brightness value of said image regions from the brightness values of the individual photosensitive regions.

24. The process according to claim 23, including the steps of deriving values corresponding to brightness from the signals of the photosensitive regions of the receiver arrangement, effecting a first intermediate storage of the brightness values of at least a portion of the individual image elements, effecting a second intermediate storage of said brightness values in second intermediate storage elements which correspond to determined brightness values or regions and determining the frequency of occurring brightness values and displaying the frequencies by the readout of the second intermediate storage elements.

25. The process according to claim 24, including determining exposure times from the values of the first and second intermediate storage elements and storing the exposure times according to said value or value range.

26. In a process for detecting the image brightness of a microscope image, comprising the steps of:

associating an image region of preselectable dimensions, with respect to the brightness values contained therein, with the frequency of occurrence of said brightness values in relation to other image regions.

27. In as process for detecting the image brightness of a microscope image, comprising the step of:

associating the frequency of occurrence of determined brightness values of image regions of preselectable dimensions with said image regions.

* * * * *